United States Patent [19]

Pachnik

[11] 4,112,987
[45] Sep. 12, 1978

[54] RADIUS ROUTER GUIDE

[76] Inventor: Ben E. Pachnik, P.O. Box 107, Sparks, Nev. 89431

[21] Appl. No.: 742,456

[22] Filed: Nov. 17, 1976

[51] Int. Cl.$^2$ .............................................. B27C 5/10
[52] U.S. Cl. ..................................... 144/323; 30/373; 30/374; 51/47; 51/126; 83/745; 90/12 D; 90/DIG. 3; 144/134 D
[58] Field of Search .............. 90/12 R, 12 D, DIG. 3; 144/134 R, 134 D, 136 R, 136 C, 136 D, 2 R, 144.5, 323; 83/745, 743; 51/47, 126, 33 R, 241.5; 30/373, 374

[56] References Cited

U.S. PATENT DOCUMENTS 692,425  2/1902  Cavicchi ................................. 51/126

FOREIGN PATENT DOCUMENTS 28,587  3/1910  Sweden ..................................... 83/745

Primary Examiner—Othell M. Simpson
Assistant Examiner—W. D. Bray
Attorney, Agent, or Firm—Clarence A. O'Brien; Harvey B. Jacobson

[57] ABSTRACT

A radius router guide having a pair of spaced legs arranged for receiving a piece of material at an end of the material where a radius is to be cut. The legs are connected to a track arrangement which slidably supports a router, and the legs are also attached to the workpiece itself in such a manner as to pivot about an appropriate axis for cutting a desired radius on the workpiece. The router slides back and forth as it swings about the pivot axis of the legs so as to form a radius on the associated end of the workpiece. At least one of the legs is adjustably mounted on the track arrangement to permit varying the spacing between the legs so as to accommodate material of different widths.

9 Claims, 8 Drawing Figures

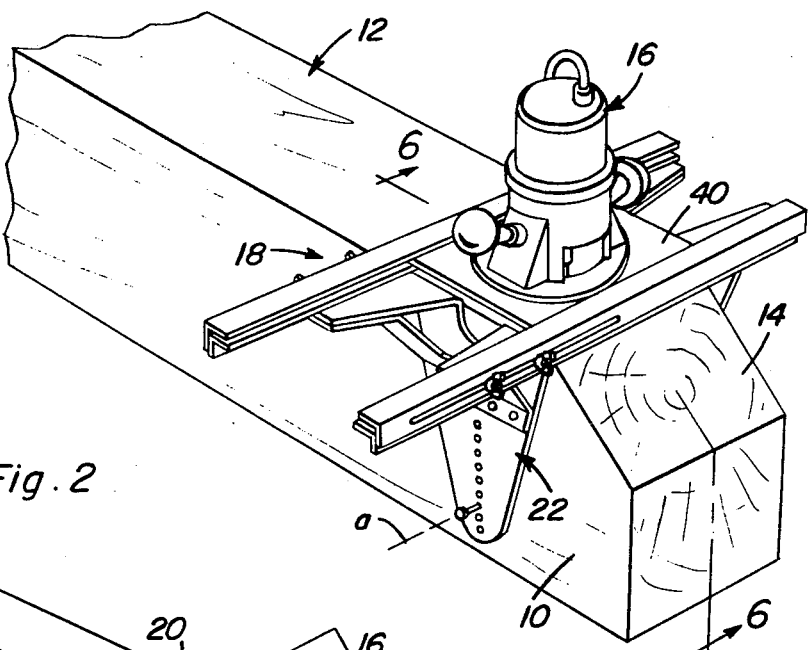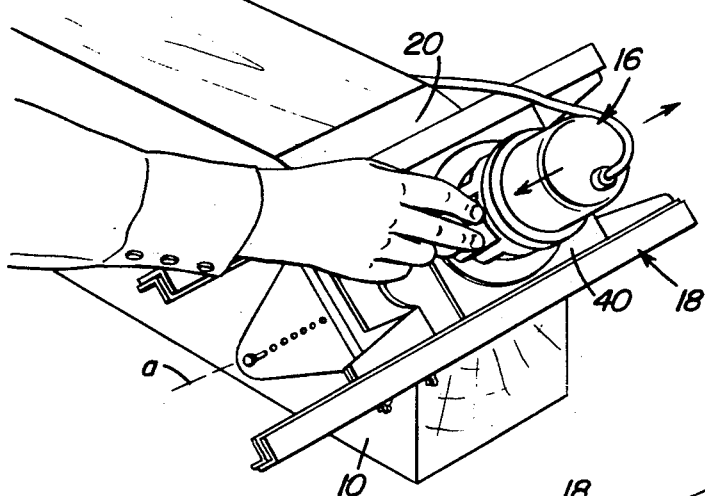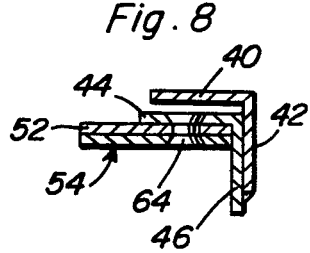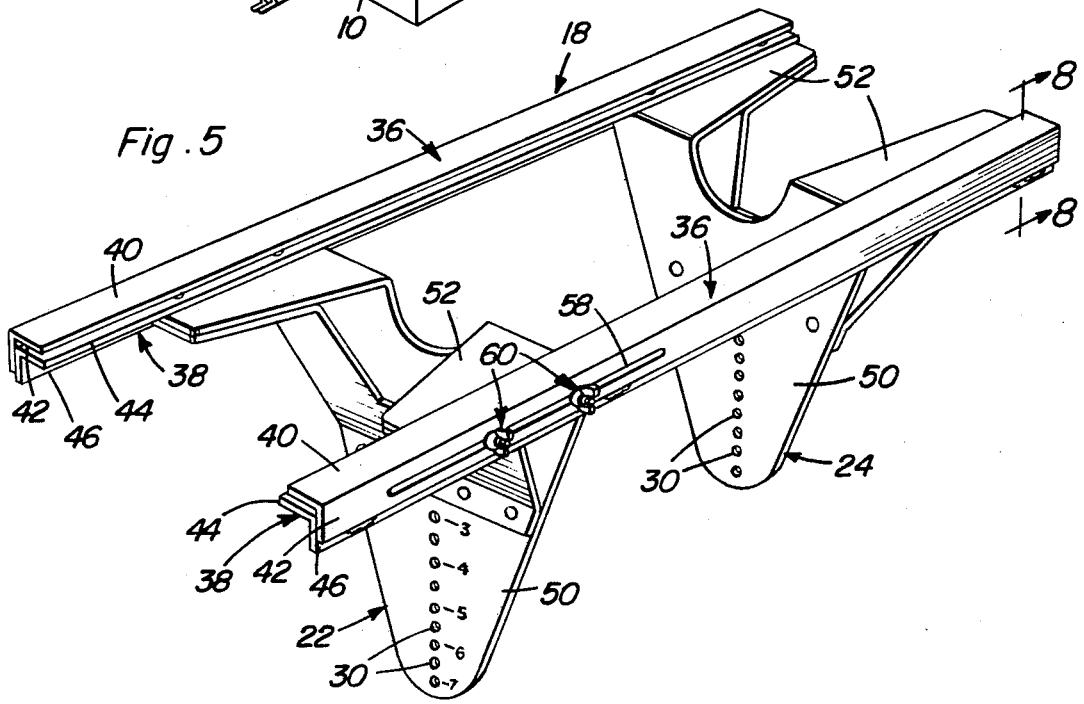

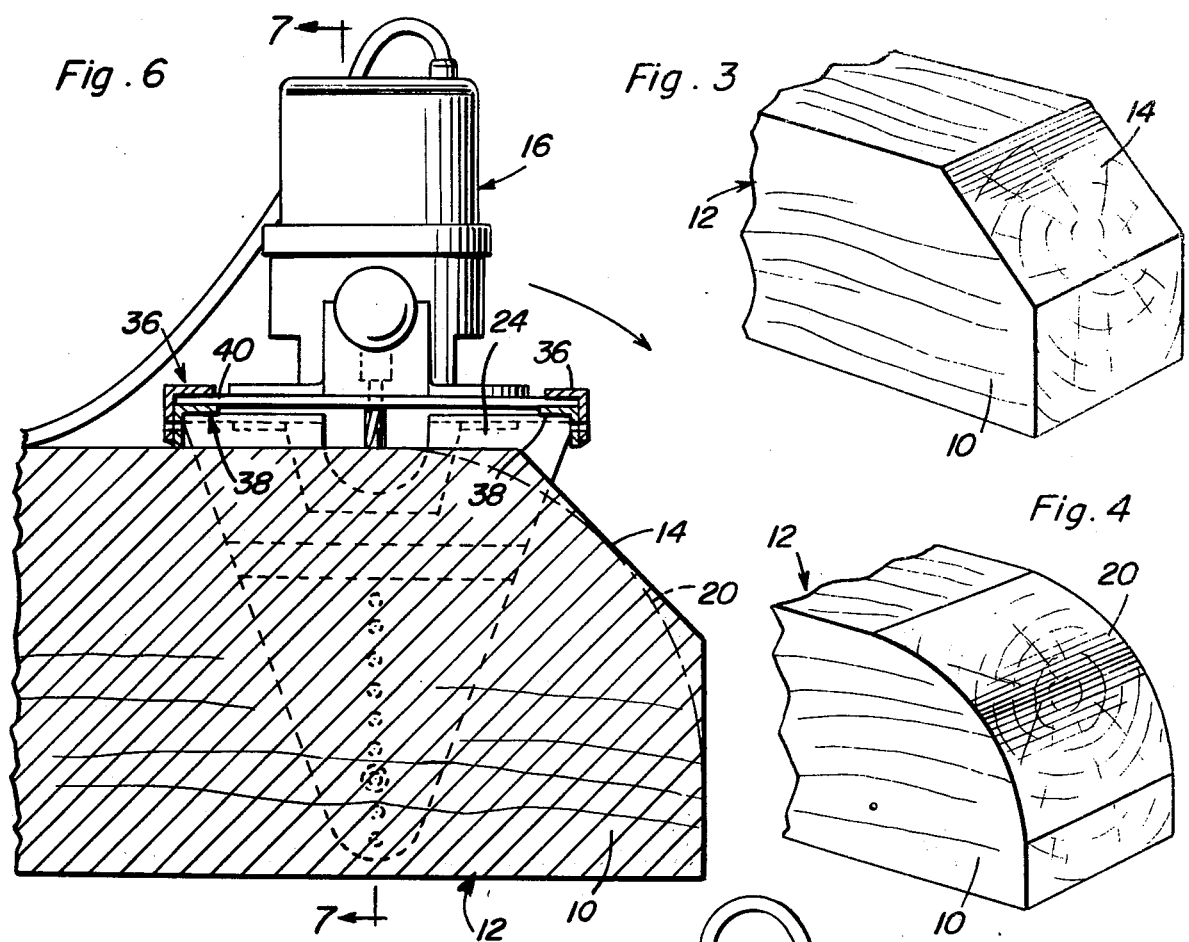
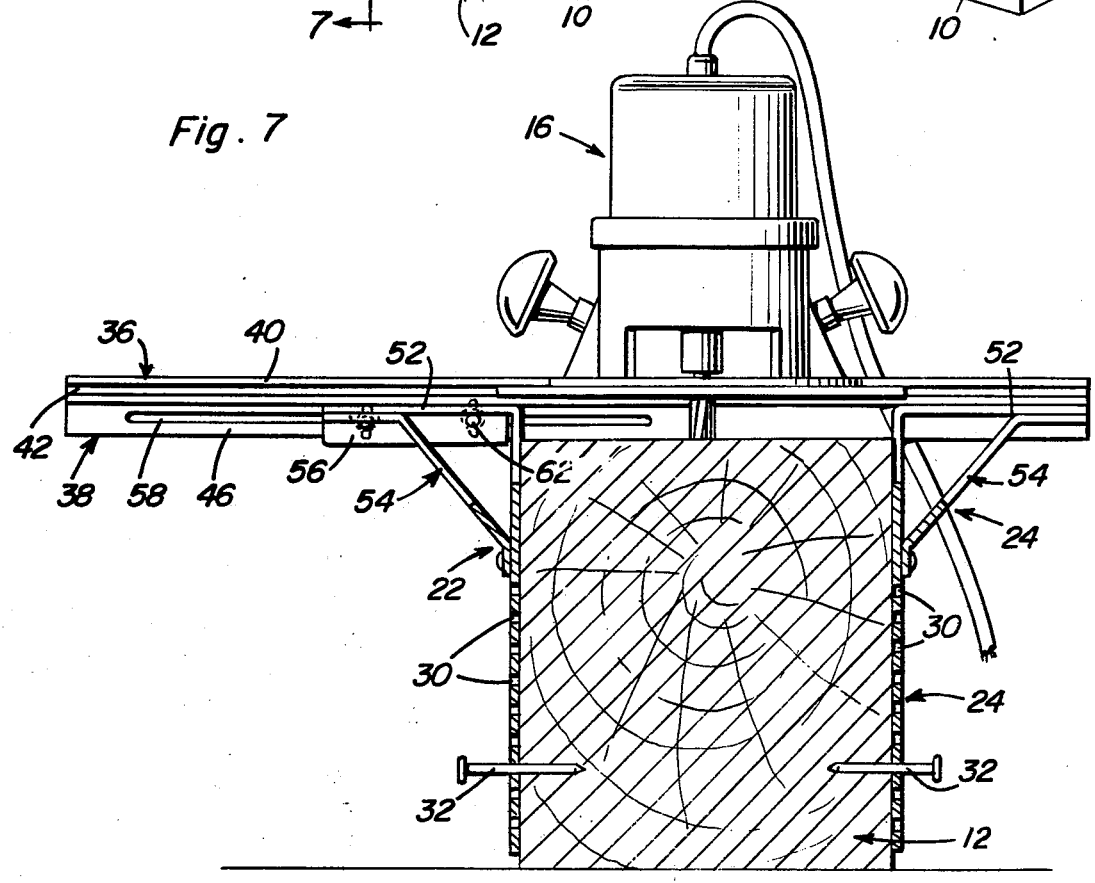

RADIUS ROUTER GUIDE

BACKGROUND OF THE INVENTION

1. Field of the Invention

This invention relates generally to a guide for a conventional router, and the like, and particularly to a guide for permitting a router to cut a radius on the end of a piece of lumber, or other suitable material.

2. Description of the Prior Art

It is generally known to provide appropriate guides for facilitating certain cutting operations employing a router or similar cutting tool.

SUMMARY OF THE INVENTION

It is an object of the present invention to provide a router guide which permits a radius to be cut at an end of a timber, beam, or other similar piece of lumber.

It is another object of the present invention to provide a radius router guide which is adjustable to fit workpieces of various widths and depths.

It is still another object of the present invention to provide a radius router guide which is simple of construction, yet rugged and reliable of operation.

These and other objects are achieved according to the present invention by providing a radius router guide having: a recess forming arrangement disposed for receiving a workpiece at an end of the workpiece where a radius is to be cut; a router support arrangement connected to the recess forming arrangement for receiving a conventional router; and a pivot system provided on the recess arrangement for permitting the recess arrangement and support arrangement to swing relative to the workpiece in order to cut a radius at the associated end of the workpiece.

The recess forming arrangement advantageously includes a pair of spaced legs mounted on the router support arrangement and extending codirectionally therefrom for receiving the workpiece between the legs. One of the legs advantageously is mounted on the router support arrangement so as to be movable toward and away from the other of the legs and vary the spacing between the legs in order to adjust to workpieces of different widths.

The pivot system preferably includes a plurality of apertures on each of the legs, with each of the apertures of each of the legs being arranged opposite a corresponding one of the apertures provided on the other of the legs for forming sets of apertures permitting adjustment of the router support arrangement relative to the workpiece in order to accommodate workpieces of different depths.

The router support arrangement advantageously includes a track system arranged for slidably mounting the router for movement back and forth between the legs of the guide. Simultaneous back and forth motion of the router along the track system and swinging of the router support arrangement about the pivot axis of the legs will cause an appropriate radius to be cut on the associated end of the workpiece.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing a radius router guide according to the present invention mounted on a workpiece to be cut and having mounted thereon a router.

FIG. 2 is a fragmentary, perspective view, similar to FIG. 1, but showing the router guide and router in a different position.

FIG. 3 is a fragmentary, perspective view showing a workpiece in one stage of having a radius cut on an end thereof.

FIG. 4 is a fragmentary, perspective view showing the workpiece of FIG. 3 having had a radius cut thereon.

FIG. 5 is a perspective view showing a radius router guide according to the present invention.

FIG. 6 is a fragmentary, sectional view taken generally along the line 6—6 of FIG. 1.

FIG. 7 is a perspective view taken generally along the line 7—7 of FIG. 6.

FIG. 8 is an enlarged, sectional view taken generally along the line 8—8 of FIG. 5.

DESCRIPTION OF THE PREFERRED EMBODIMENTS

Referring now more particularly to FIGS. 1 through 4 of the drawings, end 10 of a workpiece 12 is shown as initially provided with a face 14 for facilitating cutting of the end 10 of workpiece 12 as by a conventional router 16 slidably mounted on a radius router guide 18 according to the present invention. By appropriate use of router 16 and guide 18, a suitable radius 20 is quickly, easily, and accurately provided on end 10 of the workpiece 12.

More specifically, a radius 20 is formed on end 10 of workpiece 12 by first cutting a portion of the workpiece 12 at an acute angle relative to the end 10 of workpiece 12 on which radius 20 is to be cut. This initial cutting forms the sloped face 14. Next, router 16 is slidably mounted on guide 18 for movement over face 14 relative to workpiece 12 transversely of the radius 20 to be cut, while route 16 is also swung over face 14 about a pivot axis a through the workpiece 12 and parallel to the sliding movement of router 16.

Referring now more particularly to FIGS. 5 through 8 of the drawings, guide 18 includes a recess forming arrangement in the form of a pair of brackets 22 and 24 arranged for receiving workpiece 12 at end 10 thereof in order to cut a radius 20. The brackets 22 and 24 embrace parallel sides of workpiece 12 and extend codirectionally from a router support arrangement 26 for receiving workpiece 12 snugly between the brackets 22, 24. Bracket 22 is mounted on the support arrangement 26 so as to be movable toward and away bracket 24 in order to permit the spacing between the brackets 22 and 24 to be adjusted to workpiece 12 of different widths. Guide 18 also includes a pivot forming arrangement 28 provided on the brackets 22 and 24 for permitting the brackets 22, 24 and the support arrangement 26 to swing relative to workpiece 12 in order to cut the radius 20 at end 10 of workpiece 12.

Pivot forming arrangement 28 includes a plurality of apertures 30 provided on each of the brackets 22, 24. Each one of the apertures 30 of each of the brackets 22, 24 is arranged opposite a corresponding one of the apertures 30 of the other of the brackets 24, 22 for forming a plurality of sets of apertures which permit adjustment of the support arrangement 26 relative to workpiece 12 in order to accommodate workpieces of different depths. Nails 32, and the like, are inserted into apertures 30 and driven into the workpiece 12 for holding guide 18 on the workpiece 12 so as to permit the support arrangement 26 to swing over end 10 of workpiece 12 in a predetermined arc which permits the router 16 to cut radius 20.

Support arrangement 26 includes tracks 34 disposed for slidably mounting router 16 for movement between brackets 22 and 24. These tracks 34 include a first pair of longitudinally extending opposed angles 36 and a second pair of similar angles 38 arranged within the angles 36. Each of the first pair of angles 36 includes a leg 40 disposed coplanar with and extending toward the leg 40 of the other of the angles 36, and a leg 42 extending perpendicularly from the associated leg 40 so as to be codirectionally disposed with the leg 42 of the other of the angles 36. In a similar manner, each of the angles 38 includes a leg 44 coplanar with the leg 44 of the other of the angles 36, and a leg 46 extending perpendicularly with respect to the associated leg 44 so as to be parallel to the leg 42 of the associated angle 36. As can be readily seen from FIG. 8, the legs 40 and 44 are spaced from one another a distance sufficient to form a track which receives a peripheral portion of a plate 48 associated with router 16.

Each of the brackets 22, 24 includes a pair of perpendicularly disposed leg portions 50 and 52. Apertures 30 are provided in the associated leg portion 50, which leg portion 50 extends perpendicularly away from the longitudinal extent of the tracks 34. Each of the brackets 22, 24 is provided with an angular brace 54 for reinforcement purposes, while bracket 22 is also provided with a pair of codirectionally extending, substantially parallel, opposed flanges 56. These flanges 56 are disposed adjacent an associated one of a pair of slots 58 provided in the legs 42, 46 of angles 36, 38 for receiving fasteners 60, such as the illustrated screws and wing nuts, which fasteners, specifically the screws, also pass through hole 62 provided in the flanges 56. In this manner, the bracket 22 can be readily adjusted along the longitudinally extent of the tracks 34 so as to vary the spacing between the leg portions 50 of the brackets 22 and 24.

As can be seen from FIG. 8, while the leg portions 52 and associated braces 54 of the bracket 24 can be spot welded, and the like, to one another and to the legs 44 of angles 38 in order to connect bracket 24 to support arrangement 26, suitable rivets 64 can also be used to achieve the desired connection. Legs 42 and 46 of angles 36 and 38, respectively, may also be spot welded or riveted together as desired.

As can be appreciated from the above description and from the drawings, a radius router guide according to the invention permits a conventional router to be suitably mounted for easily and accurately providing a radius at the end portion of a workpiece, such as a timber, beam, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A radius router guide, comprising, in combination:
   (a) means defining a recess for receiving a workpiece at an end of the workpiece where a radius is to be cut;
   (b) support means connected to the means defining a recess for receiving a router; and
   (c) means defining a pivot provided on the means defining a recess for pivotally mounting the means defining a recess on the workpiece and permitting the means defining a recess and the support means to swing relative to the workpiece in order to cut a radius at the end of the workpiece, the means defining a recess including a pair of spaced brackets each having a leg portion substantially parallel to the corresponding leg portion of the other of the brackets, the brackets being mounted on the router support means and disposed extending codirectionally therefrom for receiving the workpiece between the substantially parallel leg portions.

2. A structure as defined in claim 1, wherein one of the brackets is mounted on the support means for movement toward and away from the other of the brackets in order to vary the spacing between the substantially parallel leg portions.

3. A structure as defined in claim 2, wherein the means defining a pivot includes a plurality of apertures provided on each of the substantially parallel leg portions, each of the apertures of the one of the substantially parallel leg portions of one of the brackets being arranged opposite a corresponding one of the apertures of the other of the substantially parallel leg portions associated with the other of the brackets for forming sets of apertures permitting adjustment of the support means relative to the workpiece for accommodating workpieces of different depths.

4. A structure as defined in claim 3, wherein the support means includes track means for slidably mounting the router for back and forth movement between the brackets.

5. A structure as defined in claim 4, wherein the track means includes a first pair of longitudinally extending opposed angles each having a leg extending toward the other and a leg extending substantially parallel to a corresponding leg of the other of the angles, and a second pair of angles extending longitudinally with and nesting within the angles of the first pair of angles, the legs extending toward one another of the second pair of angles being spaced from the corresponding legs of the first pair of angles in order to provide track spaces between the legs extending toward one another, such legs of each pair of angles being substantially coplanar, and a plate connected to the router, the track spaces receiving peripheral portions of the plate for permitting the router to slide along the longitudinal extent of the angles.

6. A radius router guide, comprising, in combination:
   (a) means defining a recess for receiving a workpiece at an end of the workpiece where a radius is to be cut;
   (b) support means connected to the means defining a recess for receiving a router; and
   (c) means defining a pivot provided on the means defining a recess for permitting the means defining a recess and the support means to swing relative to the workpiece in order to cut a radius at the end of the workpiece, the means defining a pivot including a plurality of apertures provided on the means defining a recess, the apertures being arranged for permitting adjustment of the support means relative to the workpiece for accommodating workpieces of different depths.

7. A radius router guide, comprising, in combination:
(a) means defining a recess for receiving a workpiece at an end of the workpiece where a radius is to be cut;
(b) support means connected to the means defining a recess for receiving a router; and
(c) means defining a pivot provided on the means defining a recess for pivotally mounting the means defining a recess on the workpiece and permitting the means defining a recess and the support means to swing relative to the workpiece in order to cut a radius at the end of the workpiece, the support means including track means for slidably mounting the router.

8. A structure as defined in claim 7, wherein the track means includes a first pair of longitudinally extending opposed angles each having a leg extending toward the other and a leg extending substantially parallel to a corresponding leg of the other of the angles, and a second pair of angles extending longitudinally with and nesting within the angles of the first pair of angles, the legs extending toward one another of the second pair of angles being spaced from the corresponding legs of the first pair of angles in order to provide track spaces between the legs extending toward one another, such legs of each pair of angles being substantially coplanar, the track spaces receiving peripheral portions of a plate associated with the router for permitting the router to slide along the longitudinal extent of the angles.

9. A method for cutting a radius on an end of a workpiece, comprising the steps of:
(a) cutting a portion of the workpiece at an acute angle relative to the end of the workpiece on which a radius is to be cut in order to permit swinging movement of a router over the face formed by the cutting;
(b) slidably mounting a router over the cut portion for movement relative to the workpiece transversely of the radius to be cut; and
(c) swinging the router over the cut portion about a pivot axis disposed extending through the workpiece and arranged substantially parallel to the sliding movement of the router.

* * * * *